United States Patent [19]

Wlodarczyk et al.

[11] Patent Number: 4,678,903

[45] Date of Patent: Jul. 7, 1987

[54] SELF ALIGNING FIBER OPTIC MICROBEND SENSOR

[75] Inventors: Marek T. Wlodarczyk, Sterling Heights; Mark K. Krage, Royal Oak; Michael J. O'Rourke, Sterling Heights, all of Mich.

[73] Assignee: General Motors Corporation, Detroit, Mich.

[21] Appl. No.: 822,340

[22] Filed: Jan. 27, 1986

[51] Int. Cl.⁴ .................................................. G01L 1/24
[52] U.S. Cl. .................................. 250/227; 250/231 R; 350/96.15; 350/96.29
[58] Field of Search ............... 250/227, 231 R, 231 P; 73/705, 800; 350/96.15, 96.16, 96.29

[56] References Cited

U.S. PATENT DOCUMENTS

| | | | |
|---|---|---|---|
| 4,071,753 | 1/1978 | Fulenwider et al. | 250/227 |
| 4,163,397 | 8/1979 | Harmer | 73/800 |
| 4,294,513 | 10/1981 | Nelson et al. | 350/96.29 |
| 4,421,979 | 12/1983 | Asawa et al. | 250/227 |
| 4,436,995 | 3/1984 | Whitten | 250/227 |
| 4,449,210 | 5/1984 | Myer | 350/96.29 |
| 4,459,477 | 7/1984 | Asawa et al. | 250/227 |
| 4,463,254 | 7/1984 | Asawa et al. | 250/231 R |
| 4,472,628 | 9/1984 | Whitten | 250/227 |
| 4,477,725 | 10/1984 | Asawa et al. | 250/231 R |
| 4,513,200 | 4/1985 | Marvin et al. | 250/227 |
| 4,530,078 | 7/1985 | Lagakos et al. | 350/96.29 |
| 4,560,016 | 12/1985 | Ibanez et al. | 250/227 |

Primary Examiner—Edward P. Westin
Attorney, Agent, or Firm—Warren D. Hill

[57] ABSTRACT

A self aligning microbend sensor comprises a tubular housing having internal threads, an expandable insert with external threads loosely threaded into the housing with sufficient tolerance to allow expansion of the insert in response to a parameter being measured while maintaining registration of the threads, and a fiber optic element between the housing and the insert and extending transverse to the threads, such that upon expansion of the insert the fiber optic element experiences microbending due to deformation by the threads.

5 Claims, 5 Drawing Figures

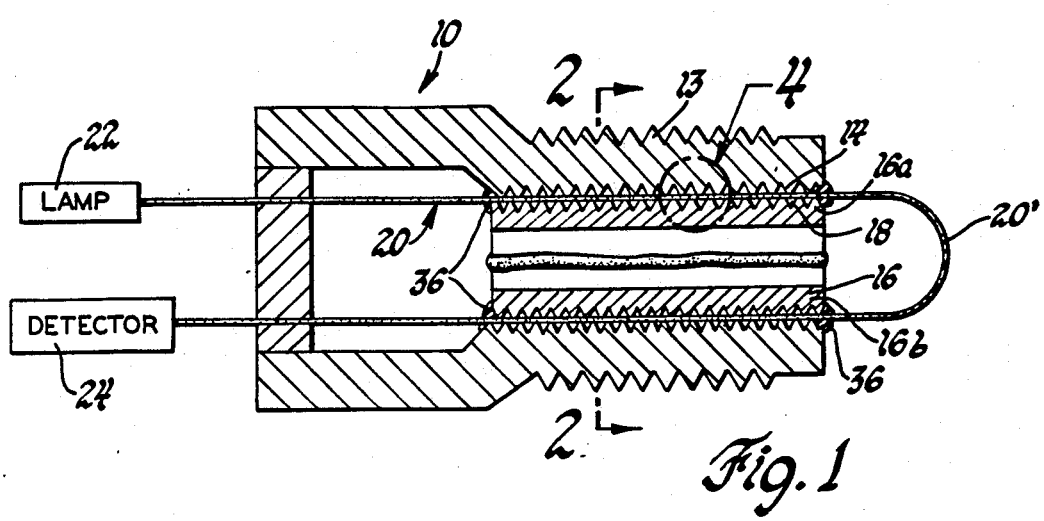
Fig. 1
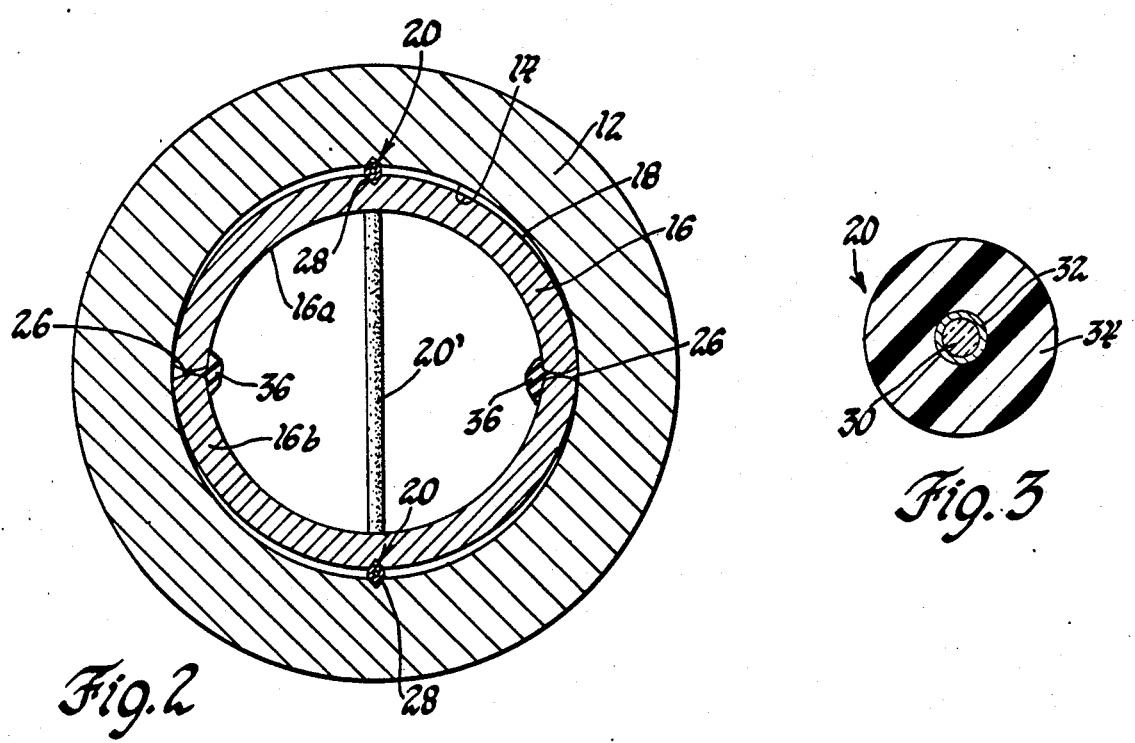
Fig. 2
Fig. 3
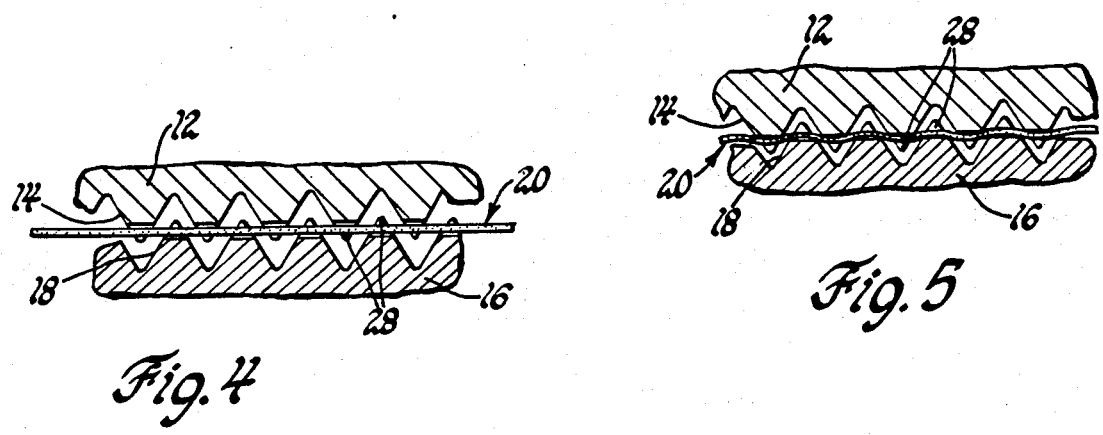
Fig. 4
Fig. 5

SELF ALIGNING FIBER OPTIC MICROBEND SENSOR

FIELD OF THE INVENTION

This invention relates to a fiber optic microbend sensor and more particularly to such a sensor which is self aligning.

BACKGROUND OF THE INVENTION

It is known to employ the fiber optics microbend effect to measure displacement, force, or any parameter which results in a fiber optic deformation. Small bends in a fiber optic fiber cause loss of radiation through the fiber cladding and can be detected by the attenuation of radiation carried by the optical fiber. Microbend transducers typically comprise a pair of plates each with rows of parallel ridges or teeth arranged to mesh with one another when the plates are moved together and a fiber optic element between the plates extending transverse to the teeth so that the teeth can deform the fiber into an undulating form. The amount of microbending and the amount of attenuation thus depends on the plate separation and thus the force, displacement or other agent which controls plate separation. Another factor affecting the attenuation is the tooth alignment of the plates. Thus for predictable and repeatable results the plates must be precisely assembled and maintained in alignment. Alignment problems have been the major drawback in microbend sensors.

SUMMARY OF THE INVENTION

It is therefore an object of the invention to provide a microbend sensor which is self aligning.

Another object of the invention is to provide such a sensor which is inexpensive and simple to construct.

The invention is carried out by a self aligning microbend sensor having a tubular housing with internal threads, an expandable insert with external threads loosely threaded into the housing with sufficient tolerance to allow expansion of the insert in response to force, or other agent being measured, and a fiber optic element between the housing and the insert and extending transverse to the threads, such that upon expansion of the insert the fiber optic element experiences microbending due to deformation by the threads.

BRIEF DESCRIPTION OF THE DRAWINGS

The above and other advantages of the invention will become more apparent from the following description taken in conjunction with the accompanying drawings wherein like reference numerals refer to like parts and wherein:

FIG. 1 is a cross-sectional view of a microbend sensor according to the invention, FIG. 2 is a transverse section of the sensor taken along line 2—2 of FIG. 1, FIG. 3 is a cross-sectional view of a fiber optic conductor used in the sensor of FIG. 1, FIG. 4 is a detail view of the thread region indicated by area 4 of FIG. 1 of the sensor in normal position, and FIG. 5 is a detail view of the same thread region of the sensor in displaced position.

DESCRIPTION OF THE PREFERRED EMBODIMENT

As shown in the drawings, a microbend sensor 10 has a tubular outer housing 12 with internal threads 14, an inner expansible insert or tube 16 with external threads 18 loosely mating with the internal threads 14, and a fiber optic element 20 extending axially through the threaded interface and looped back through the interface. The ends of the fiber optic element 20 are coupled to a lamp 22 or other radiation source and a detector 24 which monitors the modulation of the radiation by the sensor. The outer housing 12 preferably has external threads 13 for mounting to a support. In practice, a spark plug housing has been used for the housing 12 and had a nominal inner diameter of ⅝ inch and 24 threads per inch.

The expansible tube or insert 16, as best shown in FIG. 2, comprises two portions, 16a and 16b, formed by sawing a tube along a diameter to form slits 26. The tube 16, prior to sawing, has a snug fit with the internal threads 14. The kerf removed by sawing reduces the tube diameter in one dimension to provide a loose fit within the housing 12 so that movement of the portions 16a and 16b in the radial direction is possible but axial movement is prevented by the snug thread fit in the region of the slits 26. Thus the alignment of the threads in the region of the optic fiber 20 is assured. Relief or grooves 28 in the threads is provided to accommodate the fiber optic element 20. The element 20 is a conventional fiber optic light conductor shown in FIG. 3 and comprises a glass core 30 having a diameter of 100 micrometer, a cladding 32, and a protective jacket 34 having a diameter of 500 micrometer.

As shown in FIGS. 2 and 4, grooves 28 in each set of threads cooperate to define an axial passage through each side of the sensor. When the inner tube 16 is in normal or contracted condition, the passage is straight and the fiber optic element lies straight within the passage. The element 20 thus assumes a U-shape with two straight legs and an interconnecting loop 20'. When the inner tube 16 is expanded or displaced toward the housing 12, as in FIG. 5, the threads 14, 18 deform the element 20 to induce microbends. The resulting signal attenuation then is a measure of the relative position of the inner tube 16 within the housing. In an alternate structure, not shown, only one leg of the element 20 passes through the threaded region with the return leg passing through the center of tube 16. In still another version the element 20 is not looped but terminates at a mirrored end, in a well-known manner, so that the reflected signal is sensed by the detector which is coupled to the element 20 by a beam splitter.

While the sensor is inherently sensitive to mechanical displacement of an element, it can by proper design sense other agents or parameters which result in such displacement, i.e., a force acting against a resistance produces a measurable displacement. The sensor shown in FIGS. 1 and 2 is especially adapted as a fluid pressure sensor. The slits 26 and the ends of the threaded region are sealed with an elastomer such as silicone rubber seals 36 to maintain an air space in the threaded region while allowing movement of the tube portions 16a and 16b. The seals 36 normally maintain the tube portions in a neutral position where the fiber optic element is straight but due to their resilience they allow the expansible tube 16 to expand in response to fluid pressure within the tube 16. Then the element 20 experiences microbending to a degree dependent on the pressure and the signal is attenuated accordingly.

It will thus be seen that the sensor according the invention is of simple and inexpensive construction and has the property of automatic alignment of the fiber deforming teeth and perfect maintenance of the alignment. Further the sensor is readily adapted to use as a pressure sensor and its principles apply equally as well to the measurement of other forces and displacements.

The embodiments of the invention in which an exclusive property or privilege is claimed are defined as follows:

1. A self aligning microbend sensor comprising
   a tubular housing having internal threads,
   an expandable insert with external threads loosely threaded into the housing with sufficient tolerance to allow expansion of the insert in response to a parameter being measured, and
   a fiber optic element between the housing and the insert and extending transverse to the threads, such that upon expansion of the insert the fiber optic element experiences microbending due to deformation by the threads.

2. A self aligning microbend sensor comprising;
   a tubular housing having internal threads,
   an expandable insert with external threads loosely threaded into the housing with sufficient tolerance to allow expansion of the insert in response to a parameter being measured,
   a relief formed in at least one of the sets of threads along a path transverse to the threads sufficient to receive a fiber optic element without deformation in the absence of insert expansion, and
   a fiber optic element snugly fitting within the passage, so that upon expansion of the insert the fiber optic element experiences microbending due to deformation by the threads.

3. A self aligning microbend sensor as defined in claim 1 wherein the expandable insert comprises a tube with axial slits and an elastomer in the slits to permit spreading of the tube upon the application of an expanding agent.

4. A self aligning microbend fluid pressure sensor comprising;
   a tubular housing having internal threads,
   an expandable hollow insert with external threads loosely threaded into the housing with sufficient tolerance to allow expansion of the insert in response to pressure,
   a resilient seal at each end of the insert between the insert and the housing for preventing fluid leakage into the threaded region between the housing and insert so that fluid pressure applied inside the insert will cause insert expansion, and
   a fiber optic element between the housing and the insert and extending transverse to the threads, such that upon expansion of the insert the fiber optic element experiences microbending due to deformation by the threads.

5. A self aligning microbend sensor as described in claim 4 wherein the fiber optic element is in a loop coupled between a radiation source and a detector and traverses the threaded region twice.

* * * * *